United States Patent
Guilloud

[15] 3,648,380
[45] Mar. 14, 1972

[54] FLUIDIZED BED LEVEL CONTROL

[72] Inventor: Rudolph L. Guilloud, Allison Park, Pa.

[73] Assignee: Aluminum Company of America, Pittsburgh, Pa.

[22] Filed: May 28, 1970

[21] Appl. No.: 41,450

[52] U.S. Cl. .................................................. 34/10, 34/57 A
[51] Int. Cl. ............................................................. F26b 3/08
[58] Field of Search ..................... 34/10, 57; 110/28; 263/21; 55/71; 23/288.3

[56] References Cited

UNITED STATES PATENTS

| | | | |
|---|---|---|---|
| 2,985,515 | 5/1961 | McKinley | 34/10 X |
| 2,797,908 | 7/1957 | Zubrzycki | 263/21 A |
| 3,511,843 | 5/1970 | Lewis | 34/10 X |
| 2,876,557 | 3/1959 | Ducatteau | 34/57 A |

*Primary Examiner*—Edward G. Favors
*Attorney*—Elroy Strickland

[57] ABSTRACT

A method and structure for stabilizing the depth of material in a first, highly turbulent fluidized bed of solids by discharging the flow of material from the bed over a weir into a second, relatively calm fluidized bed of solids, the weir defining a boundary between the two beds. The level of the second bed is maintained at substantially the same height as the top of the weir, and an outlet opening is provided in the second bed for discharging the solids therefrom in a constant, consistent manner in comparison to that of the first, turbulent bed.

8 Claims, 2 Drawing Figures

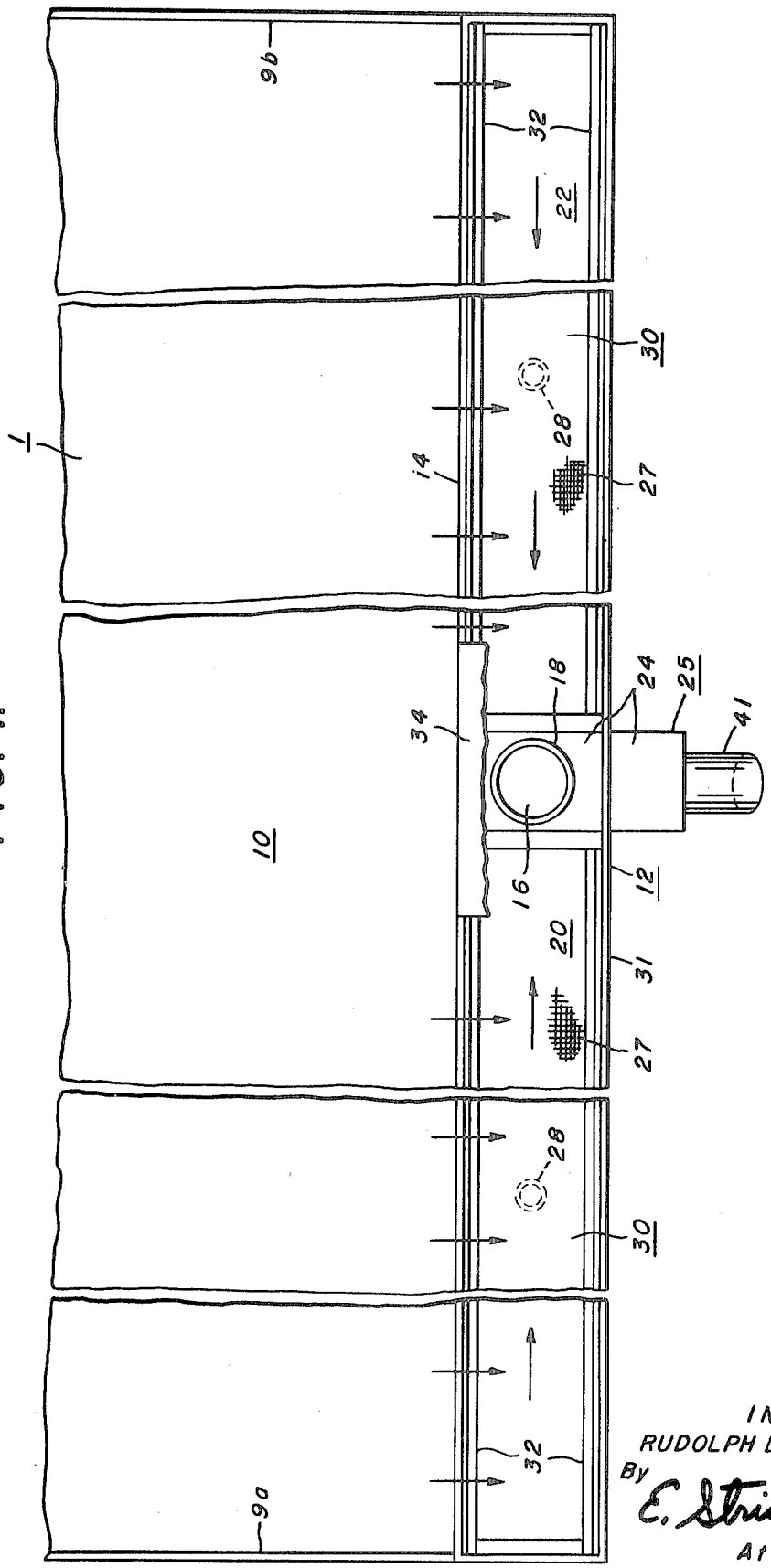

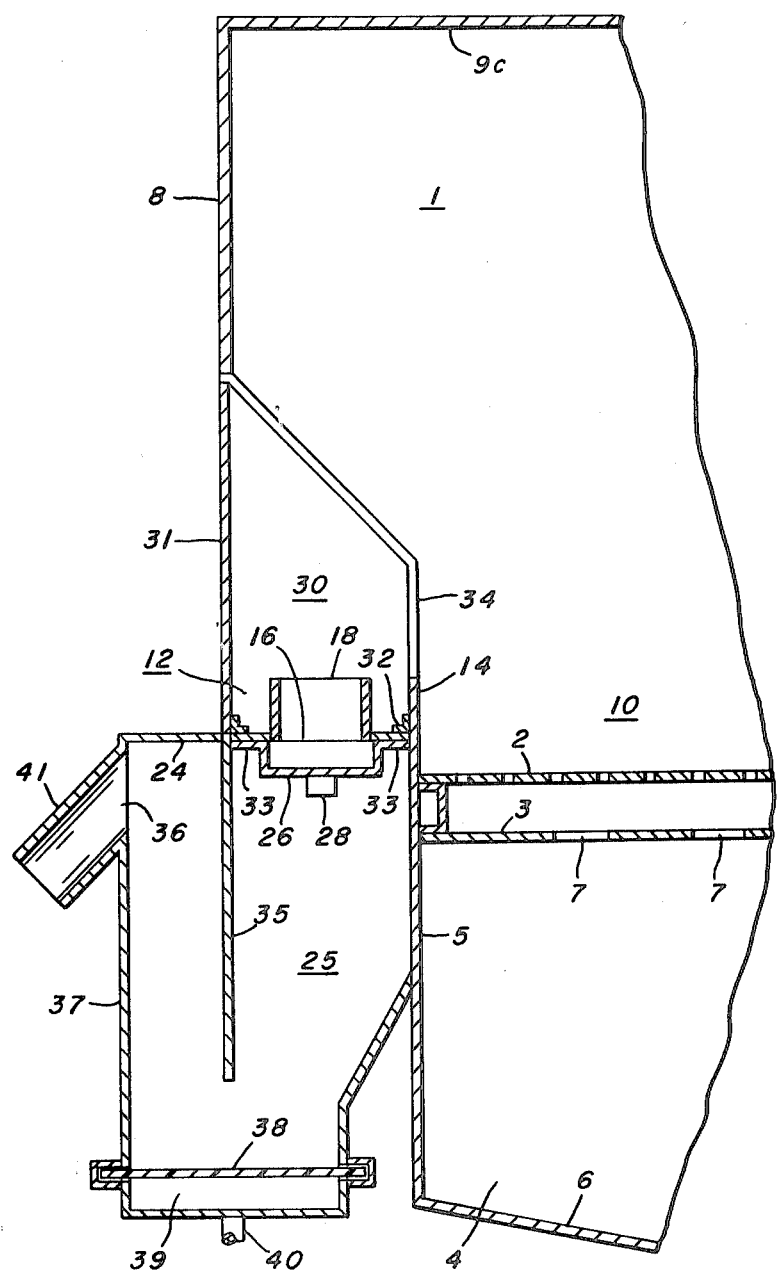

FLUIDIZED BED LEVEL CONTROL

BACKGROUND OF THE INVENTION

The present invention relates generally to fluidized beds, and particularly to means for stabilizing the bed depth of a turbulent bed and for providing a continuous self-regulating discharge of material from said bed.

A common industrial practice employed in effective chemical reactions, heat transfer between solids and gases, catalytic processes, conveying of solids, sorption of gaseous materials, and the like, involves providing a bed of finely divided solids fluidized by a gas stream rising through it, with solids overflowing from the bed through a suitable outlet as additional solids are fed into the bed. An example of such practice is described in U.S. Pat. No. 3,503,184 to Knapp and Cook, dated Mar. 31, 1970, which discloses removing hydrogen fluoride and finely divided solids from gases evolved from electrolytic cells employed in the production of aluminum, by use of a bed of alumina particles fluidized by a continuous stream of gases from the cells.

In some cases the volume and velocity of the fluidizing gas stream, and the spacing and size of perforations in a plate structure supporting the finely divided solids in a state of fluidization, and through which the fluidizing gas stream flows, are such that the fluidized solids spout and jump to create a highly turbulent bed, known as a spouting bed. Overflow discharge from such beds tends to be erratic, with the result that it is difficult to maintain a constant or consistent level of solids in the bed, despite the use of procedures for controlling the rate of flow of solids to or from the bed in response to fluctuations in depth of the bed, such as using sensing devices to detect changes in the pressure drop of the fluidizing gas stream across the bed, and varying the rate of flow of solids to or from the bed accordingly.

In many instances a rising and falling bed level is undesirable. For example, in the gas treatment method described in the above-mentioned patent, a constant bed level is important since bed depth affects directly the volume of gas flow through the bed, the efficiency of removal of hydrogen fluoride and solids from the gas stream, and the economy of the process.

BRIEF SUMMARY OF THE INVENTION

Broadly, the present invention provides a more constant bed level and more consistent discharge from the bed by use of a second fluidized bed located at the discharge end of the first, i.e., the spouting bed. The second bed has a construction and a gas flow that provides a relatively smooth, calm bed as explained in detail hereinafter. A first overflow weir is located between the first and second bed, and a second overflow weir is located in the second bed and adjacent an outlet or discharge opening in the second bed. The top edges of the two weirs are at substantially the same height so that the upper surface of the second fluidized bed is at substantially the same height as the first weir.

In operation, the fluidized solids in the first bed overflow the first weir to enter the second, calm bed and surging of the solids from the first bed into the second bed causes the solids from the second bed to return to the first bed since the upper surface of the second bed is at essentially the same height as the first weir. In this manner, the second bed helps to maintain a consistent, constant level of fluidized solids in the first, turbulent bed. And, since the second bed is relatively calm, discharge flow of solids therefrom over the second weir is relatively smooth and consistent in comparison to the overflow from the first bed.

THE DRAWINGS

The invention, along with its objectives and advantages, will best be understood from consideration of the following detailed description taken in connection with the accompanying drawings in which:

FIG. 1 is a diagrammatic plan view of a preferred embodiment of the invention in which a relatively calm, fluidized bed is located to receive the discharge of a turbulent bed (only partially shown) in accordance with the principles of the invention; and FIG. 2 is a side elevation view (with portions in section) of the structure shown in FIG. 1.

PREFERRED EMBODIMENT

Specifically, the figures show diagrammatically the discharge end of a first fluidized bed 10 of the type, for example, described in the above-mentioned Knapp et al. patent, though the invention is not limited thereto. The bed structure is shown housed in a chamber 1 (FIG. 2), the bed structure including a perforated plate 2 horizontally disposed over the upper wall 3 of a plenum chamber 4 which is formed by the upper wall, a lower end wall 5 and a bottom wall 6. The upper wall of the plenum chamber is provided with openings 7 (only two of which are shown in FIG. 2). The chamber 1 includes an upper end wall portion 8, two sidewall portions 9a and 9b, and a top wall portion 9c, the wall portions 9a and b being shown in FIG. 1, and the wall portions 8 and 9c being shown in FIG. 2.

The operation of the bed 10 is such that a dense, highly turbulent layer of finely divided solid particles (not shown) is maintained on the perforated plate 2 by a fluidizing medium directed through the plenum chamber 4 and through the openings 7 in the upper wall 3 of the plenum chamber. The particles forming the fluidized bed are continuously fed into the bed 10 at a location over the plate 2 by a suitable conveyor (not shown). In prior turbulent bed structures, for example of the type described in the above-mentioned Knapp et al., patent, an elongated outlet opening was provided in an end wall of the chamber housing the bed through which solids from the bed overflowed. An adjustable weir at the outlet opening, and extending along the length thereof, maintained the bed of fluidized solids at depth corresponding to the height of the weir. However, as explained above, if the bed was highly turbulent it was difficult to provide a constant, consistent bed depth in view of the uneven flow of solids over the weir. For example, the turbulent solids adjacent the outlet opening would spill over the weir even though the average bed depth might well be below the top edge of the weir. Thus, it was necessary, as explained above, to control the rate of flow of solids to or from the bed in order for the level of the bed to regain a suitable working depth.

In accordance with the principles of the present invention, a highly turbulent fluidized bed is provided with a more consistent discharge and a substantially constant bed depth, the turbulent bed further being self-regulating so that procedures for controlling the flow of solids to or from the bed are eliminated along with the devices and circuits required to automate such procedures.

This is accomplished by the employment of a second bed structure 12 horizontally disposed at the discharge end of the first bed 10, the second bed having a structure and being fluidized in a manner to provide a relatively calm bed as explained in greater detail hereinafter. A weir 14, provided by the upper portion of the end wall 5, as shown in FIG. 2, defines the boundary between the two beds. The structure of the second bed 12 is further provided with an outlet opening 16, shown localized in the center of the bed in FIG. 1, and a second weir 18 surrounding the opening. The second weir may be a simple pipe nipple extending to the approximate height of the first weir 14, as shown in FIG. 2.

In a preferred embodiment of the invention, the second bed 12 comprises two elongated bed structures 20 and 22, disposed in end-to-end relationship as shown in FIG. 1. The inner ends of the two structures terminate adjacent the opening 16 and pipe weir 18, the actual opening being provided in and the pipe weir being supported on the upper wall 24 of a seal chamber 25 located below the opening. The upper wall of the seal chamber is employed to connect the inner ends of the two beds together, the two beds, and the portion of the upper wall located therebetween, forming essentially a unitary bed structure, namely, the second bed 12.

Each structure of the two beds 20 and 22 comprises an elongated, lower channel or duct structure 26 (FIG. 2) supporting an air permeable material or membrane 27, along the length thereof. A suitable material would be a canvas porous throughout its surface area. (In the drawings, the permeable material or canvas is shown only in the plan view of FIG. 1. The permeable material and the upper wall 24 of the seal chamber 25 are located in substantially the same horizontal plane so that in the side view of FIG. 2, only the wall 24, with opening 16 is visible.) Each of the ducts 26 of the two beds 20 and 22 is provided with a connecting pipe portion 28 for supplying a fluidizing medium to the ducts.

An elongated upper channel 30 is formed by the canvases 27 in combination with the first weir 14 and an outside vertical wall 31 extending along the length of the end wall structure 8 of the chamber 1. A frame 32 is located over the canvas in each of the beds 20, 22 and over flange portions 33 (FIG. 2) of the duct 26 to secure the canvas therebetween.

If it is desired that the chamber 1 not be open to the atmosphere at the end at which the second bed 12 is located, the upper portions of the chamber sidewalls 9a and 9b can be made to extend out, over the second bed so that the vertical wall 31 of the second bed can extend up to and join the chamber end wall 8 as shown in FIG. 2. In this manner, the chamber 30 of the second bed opens only into the chamber 1 housing the first bed 10.

Between the first bed 10 and the opening 16 in the second bed 12 is located splash plate 34. As shown in FIG. 1, the plate extends a nominal distance on each side of the opening along the lateral extent of the beds, and, as shown in FIG. 2, the plate may extend up and join the wall portions 8 and 31.

The seal chamber 25 is employed to seal the discharge end of the chamber 1 if it is desired or required that the gases within the chamber not escape with the discharge of the fluidized particles from the beds. The chamber 25, as shown in FIG. 2, is located beneath the opening 16 provided in its upper wall 24, and is suitably attached to the outside of the wall 5 of the plenum chamber 4. The seal chamber 25 is preferably a narrow structure (FIG. 1) divided by a vertically disposed partition 35 (FIG. 2) located between an output opening 36, provided in an outer wall 37 of the chamber, and the input opening to the chamber which is the opening 16 provided in its upper wall. The lower portion of the chamber is provided with fluidizing means, namely, a fluid permeable membrane 38 supported above an air space 39 to which a fluidizing medium can be directed through a supply conduit 40 located in the bottom wall of the seal chamber.

The operation of the structure and apparatus, as thus far described, is as follows. The desired depth of the first (turbulent) bed 10 is chosen by selecting the height of the first weir 14. Similarly, the heights of the second beds 20 and 22 are chosen by the height of the second weir 18, the top edges of the weirs being preferably in the same horizontal plane.

With the height of the weirs chosen, the first bed is operated by directing solid particulate matter continuously into the bed structure, and fluidizing the particulate matter by directing a flow of fluidizing medium through the plenum chamber 4 and up through the perforated plate structure 2.

With a full bed of fluidized solids in the bed 10, and with continuous input of solid material to the bed, the solids flow over the first weir 14 along its length dimension, as indicated by the vertical arrows in FIG. 1, and into the second bed 12, i.e., into the two elongated bed structures 20 and 22 and onto their canvases 27. The solids in the structures 20 and 22 are fluidized by a second fluidizing medium, and since the material of the canvases is porous throughout its surface area the fluidizing medium flows through the canvases in a substantially even, uniform manner to provide the smooth, relative calm bed described above. Thus, the solids overflowing from the bed 10 enter a bed (beds 20 and 22) that is substantially less turbulent than bed 10, and the solids enter in such a manner that surging of the solids into the beds 20 and 22 at one location along their length causes the solids from the latter beds to return to the bed 10 at another location. Thus, the return of solids over the weir 14 helps to maintain a consistent bed level in the turbulent bed 10.

The fluidizing medium for the beds 20 and 22, which may be air, is directed to the ducts 26 via the connections 28 from a suitable source such as an air blower not shown.

The fluidized solids in the bed structures 20 and 22 move therein along the canvases 27 towards the second weir 18, as indicated by the horizontal arrows in FIG. 1. The solids spill over the second weir and through the opening 16 into the seal chamber 25 in a substantially smooth and constant manner since the fluidized solids in the second bed are substantially less turbulent than those in the first bed 10. The solids flowing over the first weir 14, which solids are turbulent, are prevented from entering the opening directly from the first bed by the plate 34 so that all the material entering the second bed will have some amount of lateral movement to the second weir and outlet opening.

The fluidized material in the seal chamber 25 is directed therefrom by gravity feed through the output opening 36 and an output pipe 41. The partition 35, extending into the material moving through chamber 25, functions to prevent the escape of gases from the chambers 1 and 30 through the seal chamber. The material in the seal chamber is fluidized by a medium directed up through the membrane 38.

With a continuous input of particulate material into a first turbulent bed, bed 10 for example, the structure of the present invention functions in the manner of a continuously fed, full container of water, the flow of water from the full container overflowing in a regular, even manner, the rate of overflow depending upon the amount and rate of water fed into the container.

From the foregoing description, it should now be apparent that a new and useful discharge apparatus and operation for a turbulent or spouting fluidized bed of solids have been disclosed, the apparatus and operation being effective to stabilize the depth of the bed. This is accomplished by use of a second, relatively calm fluidized bed disposed to receive the fluidized solids directly from the turbulent bed flowing over a weir defining the boundary therebetween, the upper surface of the second bed being maintained at the substantial height of the top of the weir. From the second bed, the solids are discharged in a constant, consistent manner in comparison to that of the turbulent bed.

Though the invention has been described with a certain degree of particularity, changes may be made therein without departing from the spirit and scope thereof.

What is claimed is:

1. A method of stabilizing the depth of material in a first, highly turbulent fluidized bed of solids, which solids are discharged from the said bed by overflowing therefrom over a weir, the steps comprising maintaining beside the said weir a second fluidized bed of the said solids, the said second fluidized bed being relatively calm in comparison to the said first bed, and maintaining the level of the upper surface of said second bed at substantially the same height as the top of the weir by controlling the rate of discharge of said solids from the second bed.

2. The method of claim 1 including the additional step of discharging the solids from the second bed over a second weir and through a discharge opening.

3. Apparatus for stabilizing the depth of material in a highly turbulent fluidized bed of solids which solids are discharged from said bed by overflowing therefrom over a weir, the apparatus comprising a second fluidized bed of solids, said second bed being relatively calm in comparison to said first bed, and a structure associated with said second bed for maintaining the level thereof at substantially the same height as the top of said weir by controlling the rate of discharge from said second bed.

4. The apparatus of claim 3 in which the structure for maintaining the level of the second bed includes a second weir, the solids in the second bed being discharged therefrom over said second weir.

5. The apparatus of claim 3 in which the second fluidized bed comprises two elongated fluidizing bed structures disposed in end-to-end relationship with each other at the discharge end of the first fluidized bed, and
an outlet opening in the second bed, and a second weir located at the juncture of said two fluidizing bed structures,
said two fluidizing bed structures being effective to direct the material therein towards said second weir and opening.

6. The apparatus of claim 5 in which the second fluidized bed includes a gas permeable membrane, and the second weir comprises a pipe nipple disposed about the opening in the second bed and extends above the plane of said membrane.

7. The apparatus of claim 5, in which a splash plate is located between the first fluidized bed and the outlet opening in the second bed to prevent flow of fluidized material directly from the first bed into the opening.

8. The apparatus of claim 5 including a chamber structure having an upper wall portion located at the juncture of the two end-to-end beds, the outlet opening being provided in said wall portion and over the interior of said chamber structure.

* * * * *